US006240237B1

(12) United States Patent
Lelu

(10) Patent No.: US 6,240,237 B1
(45) Date of Patent: May 29, 2001

(54) VARIABLE ATTENUATOR DEVICE FOR A RECTANGULAR WAVEGUIDE

(76) Inventor: Pierre Lelu, 32 rue du Plateau, Saint Cyr L'Ecole, 78210 (FR)

(*) Notice: Subject to any disclaimer, the term of this patent is extended or adjusted under 35 U.S.C. 154(b) by 0 days.

(21) Appl. No.: 09/462,238

(22) PCT Filed: Jul. 3, 1998

(86) PCT No.: PCT/EP98/04953

§ 371 Date: Mar. 27, 2000

§ 102(e) Date: Mar. 27, 2000

(87) PCT Pub. No.: WO99/01906

PCT Pub. Date: Jan. 14, 1999

(30) Foreign Application Priority Data

Jul. 4, 1997 (FR) .................... 97 08513

(51) Int. Cl.[7] .................... G02B 6/00

(52) U.S. Cl. .................... 385/140; 385/134; 385/147

(58) Field of Search .................... 385/140, 147, 385/134

(56) References Cited

U.S. PATENT DOCUMENTS 2,619,538 11/1952 Grant .................... 178/44
3,209,288 * 9/1965 Bashore et al. .................... 385/140
3,443,216 5/1969 Tsuchiya et al. .................... 324/58

FOREIGN PATENT DOCUMENTS 57-194604 11/1982 (JP) .................... H01P/1/22

OTHER PUBLICATIONS

International Search Report, dated Nov. 2, 1998.
Preliminary Search Report, dated Jul. 4, 1997.

* cited by examiner

*Primary Examiner*—Rodney Bovernick
*Assistant Examiner*—Ellen E. Kim

(57) ABSTRACT

The invention relates to an attenuator device for a rectangular waveguide, in which a plunger (10) is rotated about an eccentric axis (12) so that it penetrates into the guide (1) through a longitudinal slot (19) to an insertion height (h) which is a function of its angular position.

2 Claims, 5 Drawing Sheets

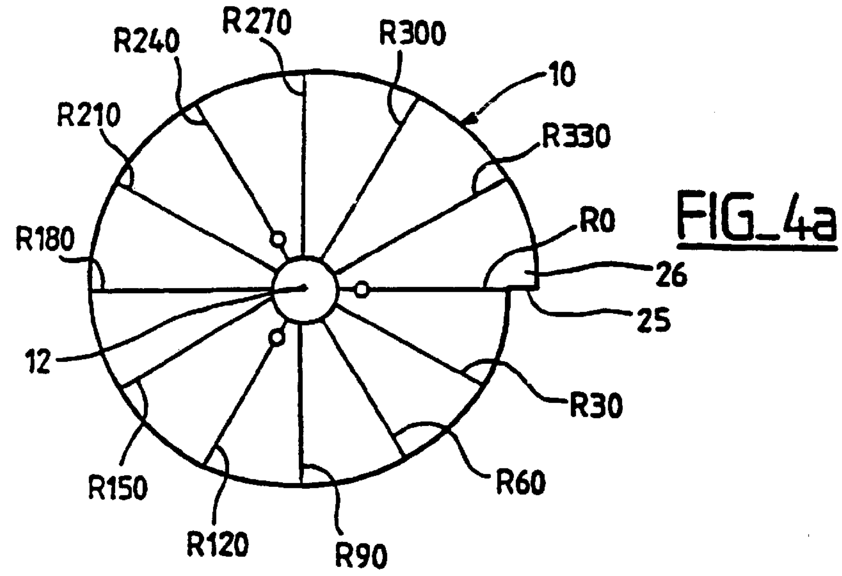
FIG_4a
FIG_4b
| τ | R0 | R30 | R60 | R90 | R120 | R150 | R180 | R210 | R240 | R270 | R300 | R330 |
|---|---|---|---|---|---|---|---|---|---|---|---|---|
| RC(τ)(mm) | / | 30 | 30 | 30,5 | 31,6 | 32,5 | 33,2 | 33,7 | 34 | 34,2 | 34,4 | 34,6 |
FIG_4c
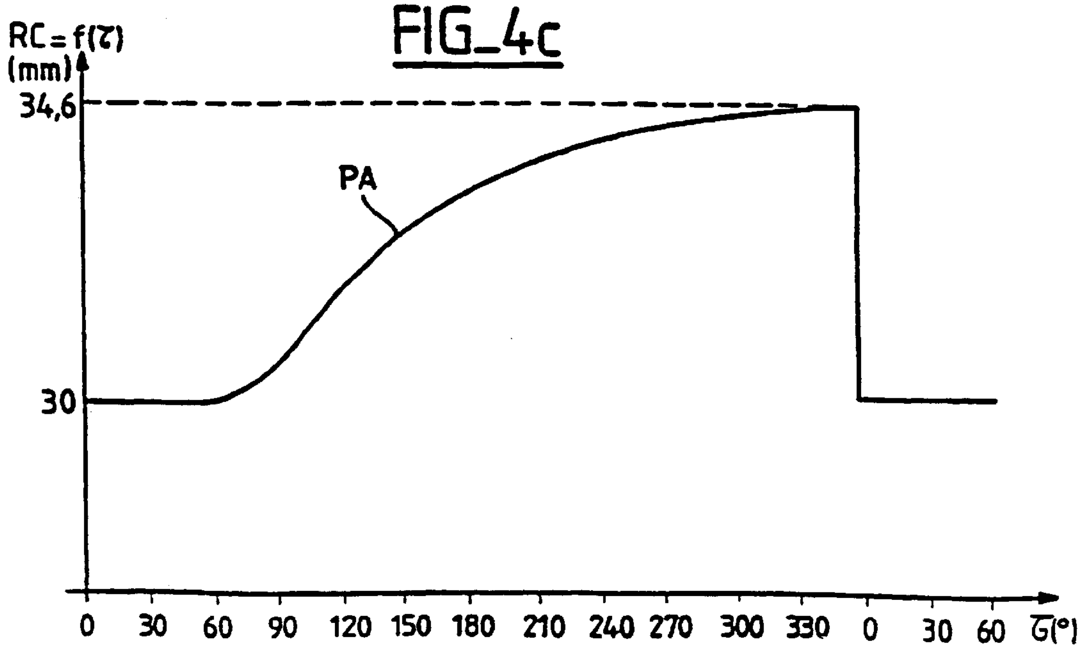

VARIABLE ATTENUATOR DEVICE FOR A RECTANGULAR WAVEGUIDE

CROSS-REFERENCE TO RELATED APPLICATION

This application claims priority of PCT Application No. 9708513, which was filed on Jul 4, 1997.

BACKGROUND OF THE INVENTION

1. Field of the Invention

The present invention concerns a variable attenuator device for a rectangular waveguide.

2. Description of the Related Art

Known attenuators are in general produced using PIN diodes arranged on a printed-circuit substrate in a π or T arrangement, and connected by microstrip lines. The diodes are used as controlled resistors to absorb the microwave variably, with good performance in terms of the reproducibility of the various attenuation values which can be selected in this way, since the resistor properties of PIN diodes are fairly stable. However, the microwave propagating in the guide must undergo a guide/line transition upstream of the attenuator and a line/guide transition downstream of it (relative to the propagation direction of waves in the guide), and this transition may give rise to matching problems. Above all, an attenuator device of this type exhibits insertion losses, that is to say residual attenuation of the microwave even when the attenuator is at its minimum setting, due to its very presence. These insertion losses are due to the intrinsic characteristics of PIN diodes and may be as much as two to three decibels (dB). Such losses are unacceptable in certain practical applications, in particular at the output of a microwave transmission system.

It is also known to introduce a plate into the waveguide through a longitudinal slot parallel to the propagation direction of the microwave.

If the plate is made of a resistive material which absorbs the energy propagated in the guide, this energy will be reduced downstream of the plate relative to the propagation direction: this produces an attenuator.

The amplitude of the attenuation depends in each case on the size of the plate and the extent to which it forms an obstacle to the propagation of the wave in the guide. It is thus possible to produce a variable attenuator by modifying the depth to which the plate is inserted into the guide, or the distance separating it from the symmetry axis of the guide parallel to the propagation direction (where the amplitude of the field is greatest).

However, the attenuator is thus dependent on a large number of uncontrolled factors. The result of this, in particular, is that the attenuation is not a linear function of the position or insertion of the plate. For this reason, the positional slaving of this plate will have its gain vary as a function of the setpoint value. In certain cases, there is a risk of the slaving being slack, and in other cases there is a risk of it oscillating.

SUMMARY OF THE INVENTION

The object of the present invention is to over-come these drawbacks of the prior art, by providing a variable attenuator device which is moreover simple and reliable.

Specifically, the present invention provides an attenuator device for a rectangular waveguide, of the type comprising a plunger element of substantially plane shape which can be inserted into the guide through a longitudinal slot along the propagation axis formed in a first face of the guide, in which the plunger element is rotated about an eccentric axis orthogonal to the propagation axis by drive means, so that the height to which the plunger element is inserted into the guide is a function of the angular position of the said element.

In particular, the invention concerns an attenuator of the above type, in which the plunger element is made of ALKAR 80, a trademark registered by UOP Inc. This material is a semi-conductor which has good attenuation perforce and good thermal stability for the power of the waves to be propagated in the application in question, which is of the order of 100 milliwatts (mW).

The eccentric drive of the plunger makes it possible to convert its rotation about the axis into a movement by which it is inserted into the guide. According to one advantage of the invention, the height to which the plunger is inserted is a direct function of its angular position. Moreover, it is known to produce angular position slaving which is simple, precise, does not vary according to working conditions nor is degraded over time.

According to another advantageous characteristic, the shape of the contour of the plunger intended to penetrate into the guide is designed in such a way that both the intrinsic response of the device (i.e. the attenuation value expressed in decibels, or gain of the attenuator) is linear and its frequency response is constant in the frequency band for which it is designed.

BRIEF DESCRIPTION OF THE DRAWINGS

Other characteristics and advantages of the invention will become further apparent on reading the following description. This description is purely illustrative and should be read with reference to the appended drawings, in which

FIGS. 4*a* to 4*c* represent a preferred embodiment of the plunger;

DETAILED DESCRIPTION OF THE INVENTION

Figure 1:
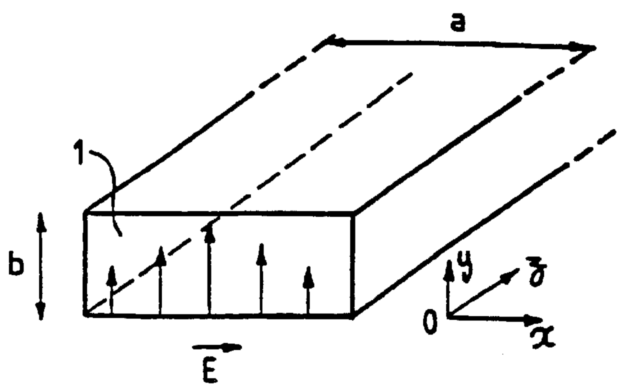
FIG. 1 represents a diagram of a rectangular waveguide.

FIG. 1 gives a schematic representation of a rectangular waveguide portion. A guide 1 of this type has a rectangular cross-section in a plane xOy and extends longitudinally along an axis Oz which defines the propagation direction in the guide. The guide has long sides along the axis ox defining its width a, as well as short sides along the axis Oy defining its height b (with, in general, a=9×b/4). As is known, the boundary conditions of this guide define solutions to the Maxwell equations which consist of superpositions of waves having equal frequency but different cutoff wavelengths. These waves correspond to various propagation modes. It is known that, if the wavelength λ of the incident wave is less than a cutoff wavelength λc equal to 2×a, only the fundamental propagation mode, referred to as the $TE_{10}$ mode, can exist inside the guide.

According to this $TE_{10}$ mode, only an electric field exists inside the guide. Its force lines are parallel to the axis oy (and therefore to the short sides of the guide). This field propagates energy along the axis Oz. Its amplitude is a maximum at the centre of the guide (along the symmetry axis of the guide parallel to the axis Oz) and decreases on approaching the short sides, where it becomes zero.

Figure 2:
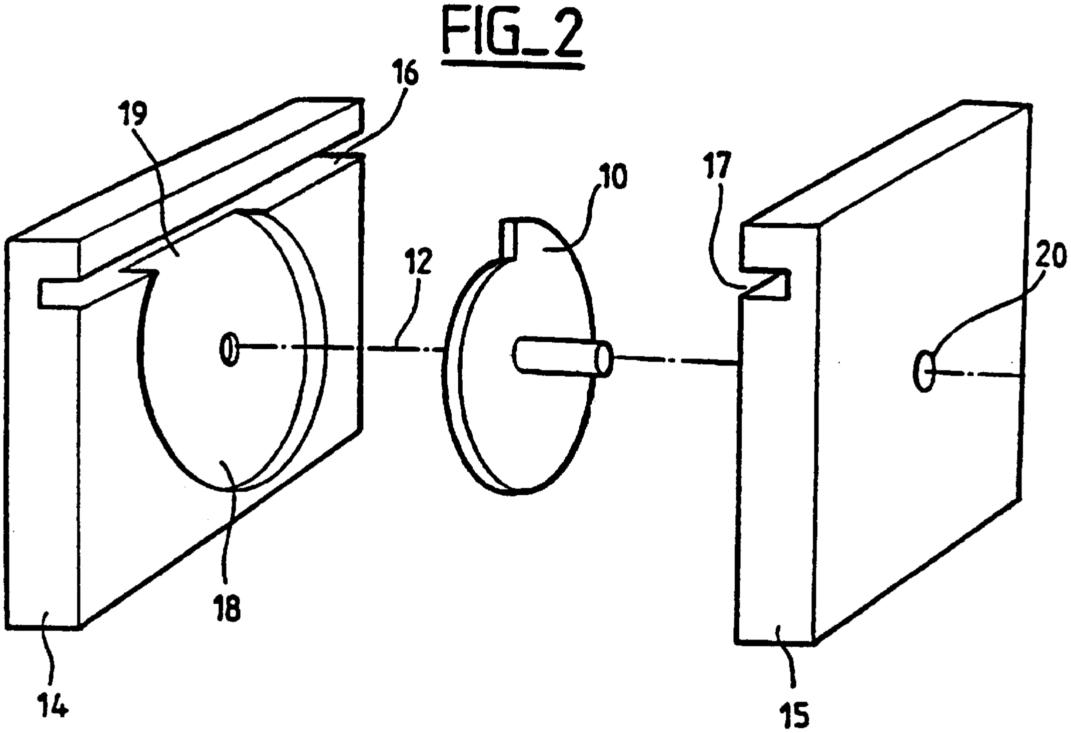
FIG. 2 represents a view of a device according to the invention.

FIG. 2 represents one embodiment of an attenuator device according to the principle of the invention. The device is in the form of a module including two symmetrical half-shells 14 and 15. Each half-shell includes a longitudinal groove 16 or 17 of depth equal to a/2 and of width equal to b. It will be noted that, once the half-shells 14 and 15 have been assembled, these grooves 16 and 17 constitute the waveguide of width a and of height b. These half-shells are produced by machining a block of conductive material such as aluminium. Each half-shell 14 and 15 also has a blind recess, for example of circular shape, referenced 18 for the half-shell 14 (not visible for the half-shell 15) which opens into the respective groove 16 or 17. Once the two half-shells have been assembled, the intersection between the grooves 16, 17 and these blind recesses defines a slot for the insertion of a plunger. The blind recesses then define a circular cavity which encloses a plunger 10 mounted so as to rotate (about an axis of rotation 12) in the cavity by means of a shaft 19 accommodated in suitable holes in the half-shells. Advantageously, the energy absorbed by the plunger in the guide (this absorption being the basis of the attenuation of the incident wave) is dissipated in the form of heat in the absorbent material made of ALKAR 80. At least one of the holes 20 in one of the half-shells 15 is a through-hole, so that the shaft 19 of the plunger can be driven externally by drive means and can be connected to an angular position encoder, also arranged outside the two half-shells after they have been assembled.

The plunger is of substantially plane shape. In the figures, it has the general shape of an irregular disc (that is to say one whose radius of curvature is not constant) but it is conceivable for it to have the shape of a half-disc or any other portion of such a disc (i.e. a sector of arbitrary angular aperture). A preferred embodiment of the plunger according to the invention will be described below with reference to FIGS. 4*a* to 4*c*.

The axis of rotation 12 of the plunger 10 coincides with the centre of the circular cavity 13, the radius of which is larger than the greatest distance between the axis of rotation 12 and the contour of the plunger 10.

According to the invention, it is necessary for the contour of the plunger to have a configuration such that the axis of rotation 12 is eccentric. This expression is intended to mean that, for each elementary portion of the contour of the plunger 10 that is intended to penetrate into the guide, the radius of curvature defined relative to the axis 12 has a value different from that which it has for a neighbouring elementary portion. Put another way, the radius of curvature at an arbitrary point on the contour of the plunger, defined relative to the axis of rotation 12, is a variable function of an angle τ defining the position of the said point relative to an arbitrary reference. The height to which the plunger is inserted into the guide is thus a function of the angular position of the plunger. It should be remembered that the maximum value of the radius of curvature defined in this way is less than the radius of the circular cavity 13, so that the plunger can rotate in the cavity.

Figure 3:
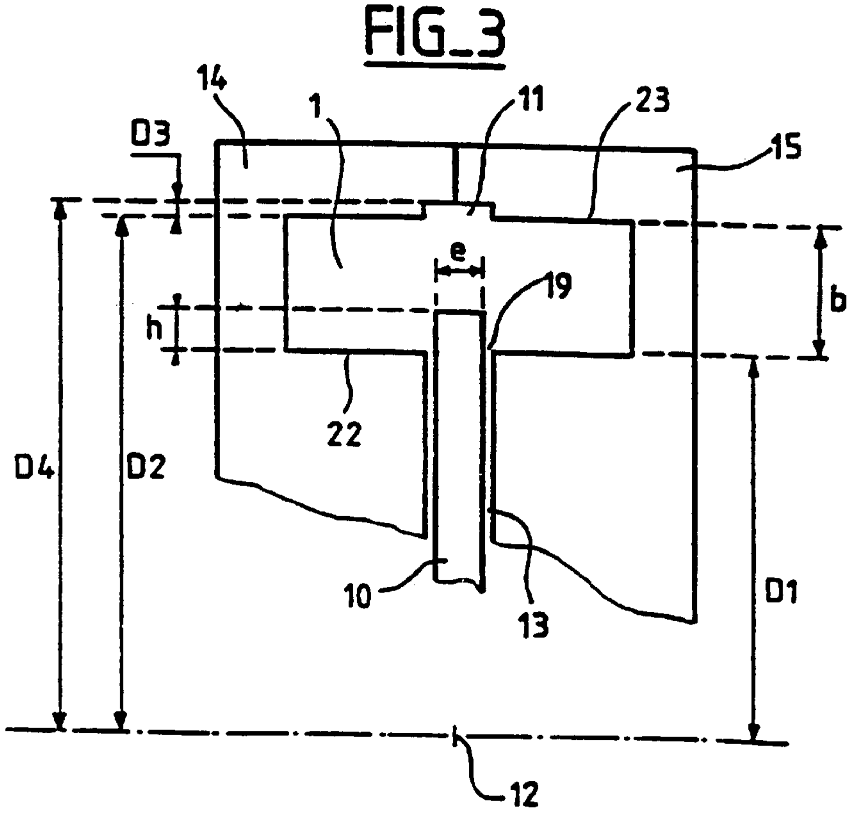
FIG. 3 represents a partial view, in section, of the device according to the invention.

FIG. 3 represents a partial view of the device according to the invention in section in a plane orthogonal to the axis Oz, which is the plane of symmetry of the slot 19, restricted to a region around a section of the waveguide 1. 12 denotes the axis of rotation of the plunger 10. The axis 12 is orthogonal to the propagation direction Oz of the waves in the guide. It is contained in the section plane defined above. D1 denotes the distance separating the axis 12 from the lower face 22 of the guide D2 denotes the distance separating the axis 12 from the upper face 23 of the guide. The difference between the distance D2 and the distance D1 clearly corresponds to the height b of the guide.

A cutout 11 of U-shaped cross-section is made level with the plunger 10 in the upper face 23 of the guide. The depth of this cutout varies along the axis Oz and is a maximum in the plane of the axis 12 orthogonal to Oz, as is represented in FIG. 3 where it is referenced D3. Furthermore, D4 denotes the distance between the axis 12 and the bottom of the cutout 11 in the plane of the said axis. It will be noted that the difference between the distance D4 and the distance D2 clearly corresponds to the depth D3 of the cutout 11.

In a preferred embodiment, the distance D1 is equal to 30 mm. The dimensions of the waveguide are a=10.66 mm and b=4.32 mm. The distance D2 is therefore equal to 34.3 mm. The distance D4 is equal to 35 mm. The radius of the recess 18 formed in each half-shell 14, 15, and therefore the radius of the cavity 13, is equal to 35 mm.

According to an advantageous characteristic of the invention, the cutout 11 is produced at the same time as the circular recess 18 in a raw aluminium block during the same machining operation. The radius of the circular cavity 13 is then necessarily equal to D4. The cutout 11 thus has the shape of a circle arc in the section plane yOz, with the same radius and the same centre as the cavity 13. With the dimensions indicated above, the maximum depth of the cutout 11 is D3 equal to 0.7 mm level with the axis 12. The thickness e of the plunger 10 is equal to 1 mm. The depth of the circular recess 18 made in the half-shell 14 is identical to that of the corresponding recess in the half-shell 15, and is more than 0.5 mm. In this way, the width of the cavity 13, identical to the width of the cutout 11, is slightly more than 1 mm so as to ensure a tolerance for mounting the plunger 10, and in particular its alignment on its axis of rotation 12. The dimensions indicated above clearly depend on the frequency range of the waves for which the attenuator is intended to be used. The numerical values which are indicated correspond to an attenuator for the 23 to 26 GHz range.

The peripheral part of the plunger penetrates partially into the guide 1 through the slot 19. As indicated above, according to the invention the height h of the portion of the plunger 10 which is inserted into the guide 1 through the slot 19 is a function of the angular position of the said plunger 10, which is capable of rotating about the axis 12. In what follows, and in FIG. 3, this height h is measured from the lower edge 22 of the guide 1.

The plunger may, for example, be a perfect disc, but with an eccentric axis of rotation, that is to say one which is different from the geometrical centre of the said disc. In what follows, the shape of the disc is preferentially described by referring to the radius of curvature of each elementary portion of its contour, defined relative to the axis of rotation 12 about which the plunger is driven by drive means.

According to the invention, this radius of curvature RC is a variable function of the angle τ referencing the position of the relevant portion of the perimeter relative to a reference radius R0.

FIG. 4*a* represents the preferred embodiment of the plunger 10 on a 1:1 scale.

Starting from the reference radius R0 (or origin radius) which, in FIG. 4, coincides with the trigonometric zero, the radius of curvature at each point on the contour of the plunger 10 is a continuous and differentiable (except at the reference radius R0), never decreasing function of the angle τ, when the latter increases in the clockwise direction. For example, at the point on the contour lying on a radius R30 corresponding to an angle of 30° relative to the origin radius R0 in the clockwise direction, the radius of curvature of the perimeter will be equal to 30 mm.

Figure 5A:
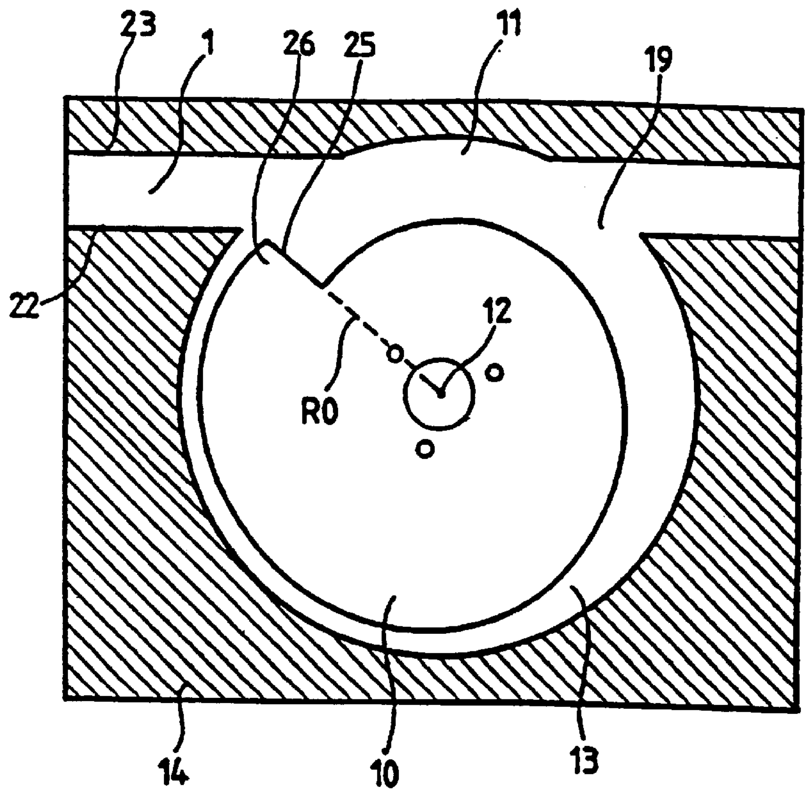
FIG. 5*a* to 5*c* represent three complementary views of the device according to the invention, showing different angular positions of the plunger.
Figure 5B:
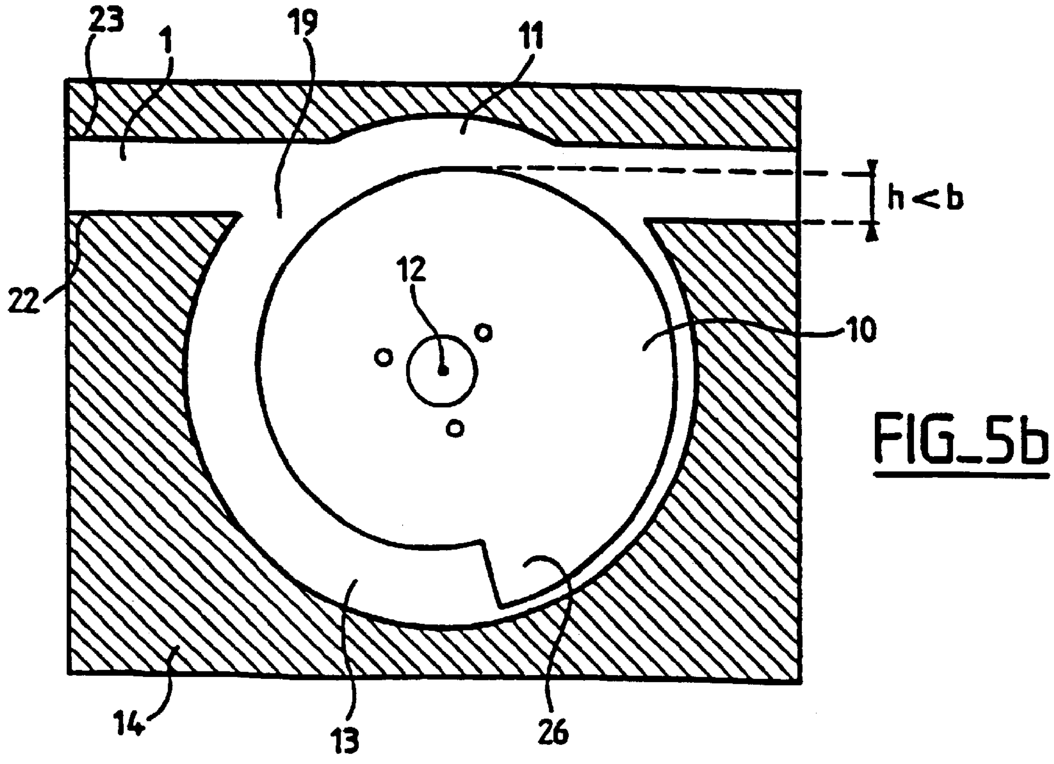

The table in FIG. 5*b* gives values of the radius of curvature for various points on the perimeter, corresponding to twelve successive angles whose value increases in steps of 30° in the clockwise direction. Between these values, the radius of curvature varies continuously. FIG. 5*a* shows that, at the reference radius R0, the contour of the plunger 10 has a radial portion 25 corresponding to a discontinuity in the function relating the radius of curvature RC to the angle τ. Indeed, the radius of curvature changes abruptly at this point from 34.6 to 30 mm. This discontinuity gives the plunger 10 an angular part or tooth 26. The technical effect and the advantages of these structural characteristics of the plunger will be described below.

FIG. 4*c* represents the periodic function f such that RC=f(τ) as a function of the angle τ measured relative to the origin radius R0 in the clockwise direction. In this figure, it can be verified that the function f is continuous, never decreasing and differentiable except at the origin.

The exact shape of the contour of the plunger is determined empirically. Preferably, it is in particular chosen in such a way that the intrinsic response of the attenuator (i.e. the gain of the attenuator, that is to say the attenuation expressed in dB as a function of the angular position of the plunger) is linear.

This arrangement makes it fairly simple to control the means for driving the plunger, since the response of the device whose position is to be slaved is linear.

Figure 5C:
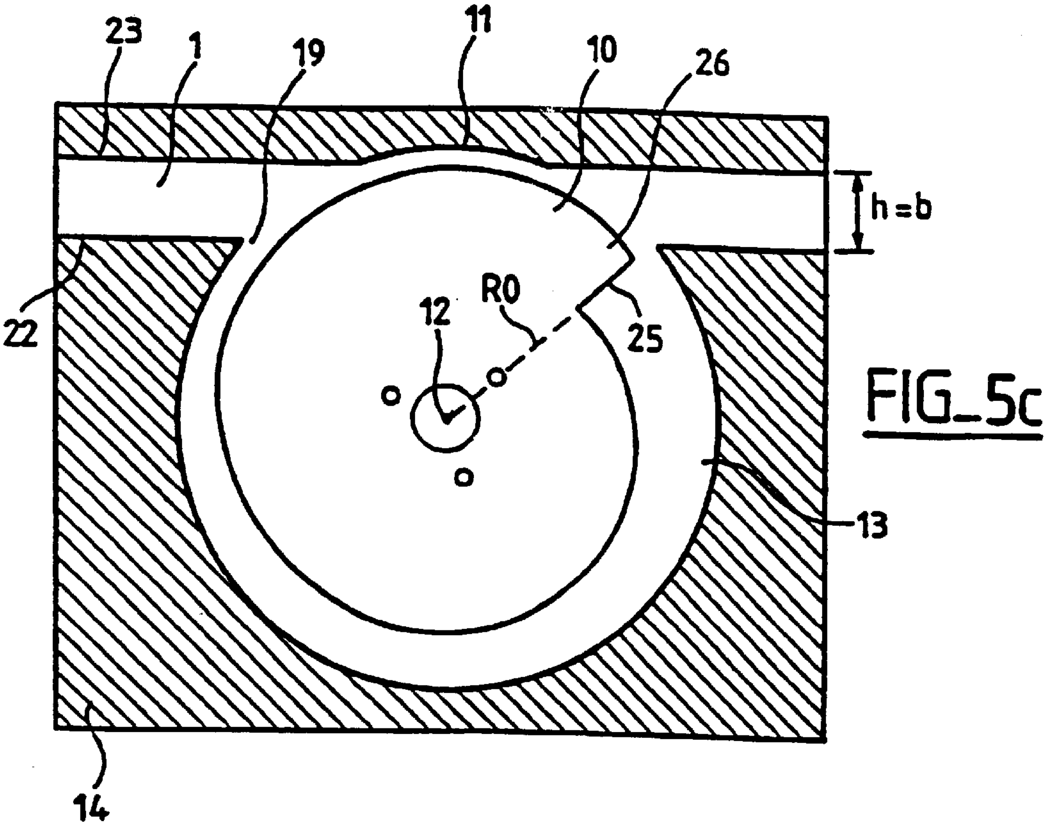

FIGS. 5*a* to 5*c*, in which the same elements have the same references, represent three different angular positions of the plunger 10. It can turn about its axis 12 inside the cavity 13.

In these figures, the radius R0 coinciding with the tooth 26 is used as a reference for describing the angular position of the plunger. Furthermore, the length of the radial part 25 of the contour of the plunger has been intentionally increased relative to the corresponding dimensions indicated in FIG. 5, so as to emphasize the principle by which the plunger is inserted into the guide according to the invention.

FIG. 5*a* represents a first extreme position of the plunger, in which the radius R0 is substantially aligned with the intersection between the lower face 22 of the guide 1, on the one hand, and with the contour of the cavity 13, on the other hand. In this position, the contour of the plunger 10 (except of course at the discontinuity which the tooth 26 constitutes) is tangent to the lower face 22 of the guide, so that the plunger does not penetrate into the guide (h=0). The slot 19 is then advantageously filled at its centre (relative to the direction Oz of the guide), with the material constituting the plunger largely replacing the material removed to form the slot 19. The boundary conditions for the Maxwell equations inside this portion of the guide thus approach those of a perfect guide (i.e. one without a slot).

FIG. 5*b* represents the plunger 10 in another angular position. Relative to the angular position in FIG. 5*a*, the plunger has then turned in the anti-clockwise direction about the axis 12, so that the tooth 26 is substantially at the bottom of the cavity 13. Since the axis 12 is eccentric relative to the contour of the plunger 10, a portion of the latter is then inserted into the guide 1 through the slot 19. The height h to which the plunger is inserted into the guide is then non-zero and less than the height b of the guide (h<b).

FIG. 5*c* represents a second extreme position of the plunger, in which the radius R0 intercepts the intersection between the slot 19 and the cavity 13 downstream of the plunger relative to the propagation direction of the waves in the guide. This position is obtained from the one represented in FIG. 5*b* by continuing to rotate the plunger about the eccentric axis 12 in the anti-clockwise direction. The height h to which the plunger is inserted into the guide is then equal to the height b of the guide (h=b), or even slightly greater if the periphery of the plunger penetrates into the cutout 11. The guide is then said to be closed, but this does not correspond to the actual geometrical case since the thickness e of the plunger is less than the width a of the guide. Nevertheless, this situation corresponds to the maximum attenuation which can be obtained with a plunger of given thickness. The role of the cutout 11 is to allow the plunger to close the guide but without running the risk of coming into contact with its upper face 23, which could damage one or other of them and could above all cause the plunger to jam. The cutout 11 thus allows the guide to be fully closed without the risk of the plunger jamming, taking into account the mechanical tolerances in manufacture and assembly.

According to an advantageous characteristic of the invention, the shape of the contour of the plunger is also chosen so as to avoid a high reflection coefficient in the guide, at the obstacle which the plunger constitutes. Indeed, the contour of the plunger, or at least that part of it intended to penetrate into the guide, presents a surface area in the projection plane xOy orthogonal to the propagation direction Oz of the waves inside the guide which varies progressively and continuously (without discontinuity) as the plunger is rotated about the eccentric axis 12 and is inserted into the guide through the slot 19. Since the thickness e of the plunger is constant, this is equivalent to saying that the height h to which the plunger is inserted into the guide then varies progressively and continuously. The reflections inside the guide are thereby limited. This ensures a progressive transition of the wave regime inside the guide, by eliminating the SWR (standing wave ratio) upstream of the plunger relative to the propagation direction of the waves in the guide.

According to the preferred embodiment of the plunger as described above with reference to FIGS. 4*a* to 4*c*, this is obtained by the fact that the radius of curvature RC of the contour of the plunger is a continuous and differentiable function of the angle τ measured from the origin radius R0 (i.e. RC=f (τ) with f a continuous and differentiable function), at least for the part of the plunger intended to penetrate into the guide. Its shape is, for example, a spiral.

In this way, the frequency response of the attenuator, that is to say the value of the attenuation as a function of the frequency of the incident wave for an arbitrary angular position of the plunger, is constant in the frequency band for which it is designed (here 23 to 26 GHz).

This arrangement is advantageously combined with the attempt to have a linear intrinsic response of the attenuator.

It will be noted that, with a plunger shaped as represented in FIGS. 4*a* to 4*c* and in FIGS. 5*a* to 5*c*, the rotation of the plunger is limited to a portion of the trigonometric circle such that the tooth 26 is always kept in the cavity 13 and never penetrates into the guide. For safety, an angular sector of the plunger which has an aperture equal to 90° and is centred on the radius R0 will always be kept inside the cavity 13, that is to say it does not even partially penetrate into the guide 1. It will be noted, referring again to the table in FIG. 4*b* and the curve in FIG. 4*c*, that the radius of curvature RC of the contour of the plunger is constant over portions of the contour which lie on either side of the radius R0. Only a portion PA of the contour of the plunger, referred to as the active portion, is intended to penetrate into the guide. In the example, this active portion PA of the contour corresponds to an angular sector of the plunger having the axis 12 as its vertex and with an aperture of 270°. In other words, only the portion of the contour of the plunger located between the point at 45° and the point at 315° relative to the origin radius will be able to penetrate into the guide, under the action of the plunger drive means. It is, in particular, in this active portion PA that the radius of curvature RC of the contour varies without decreasing. This active portion lies between an initial position and a final position of the plunger, which are separated by an angle of rotation of the plunger equal to 270°.

Figure 6:
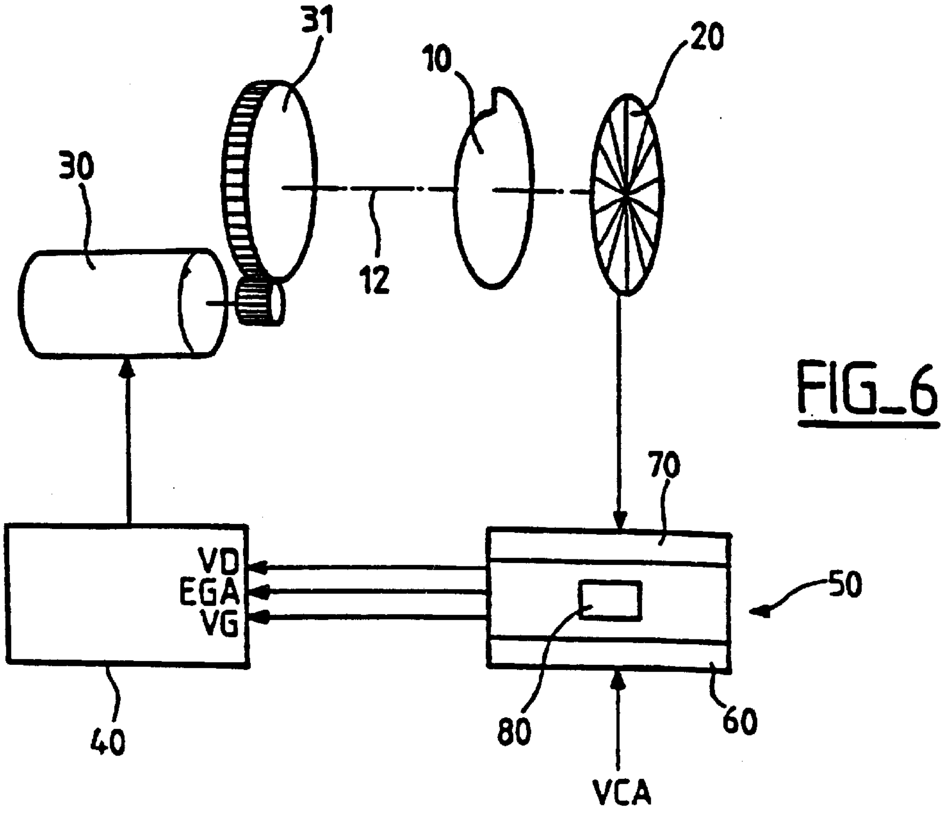
FIG. 6 represents a diagram of the operation of the device according to the invention.

FIG. 6 represents a diagram of a device for implementing the attenuator according to the invention. The plunger 10 is rotated about the axis 12 by a motor 30 by means of a gear 31 forming a reducer.

An angular position encoder 20 is linked in rotation with the plunger 10 so as to be driven without sliding relative to it. The information provided by the encoder 20 is transmitted to a digital management unit 50. The position encoder 20 is, for example, an encoder of the Gray type, in which case the information which it transmits to the management unit 50 must be converted into binary code before any calculation. The numerical value of the actual position of the plunger 10 which the encoder 20 supplies in Gray code is then converted into binary value and is recorded in a register 70 for the actual position in the management unit 50, for example a shift register.

The management unit 50 also receives a binary setpoint position value stored in a setpoint register 60, for example a shift register. This register can itself be programmed to receive the setpoint angular position value of the plunger, as will be explained below. The management unit 50 digitally takes the difference bit by bit between the setpoint value delivered by the register 60, on the one hand, and the value of the actual angular position of the plunger 10, delivered by the register 70, on the other hand. If there is a positive difference between the above two binary values, the management unit 50 delivers a high logic state (i.e. a logic 1) on a first input VG of a power module 40 for supplying the motor 30, and a low logic state (i.e. a logic zero) on a second input VD and a third input EGA of the said module. In the event of a negative difference, the management module delivers a logic 1 on the second input VD and a logic zero on the first input VG as well as on the third input EGA of the power module 40. In the case of equality between the two binary information items, the management unit 50 transmits a logic 1 on the third input EGA of the power module 40 and a logic zero on the first VD and second VG inputs of the said module 40. The power module 40 is designed to produce, for the motor 30, a supply voltage intended to rotate it in a first direction in the first case and in the other direction in the second case, and to keep it at rest in the third case above. The motor 30 is, for example, a DC motor and the supply voltage produced by the power module 40 is a bipolar continuous voltage. As will have been understood, the management unit 50 is, for example, a microcontroller.

The mechanical coupling between the plunger 10 and the angular position encoder 20 which, it will be recalled, is slideless coupling, is for example produced using studs. It is such that, after assembly, the relative position of one with respect to the other is not known. This is one of the reasons why it is necessary to calibrate the attenuator after it has been assembled in the workshop and before it is used. This calibration is carried out in the laboratory and consists in positioning the attenuator at a certain number of angular positions, for example at 128 different angular positions if the encoder 20 is a seven-bit encoder, and in measuring the attenuation which the attenuator produces for each of these positions. A selection is then made of the 41 positions, defined by a seven-bit binary word, which correspond to the attenuation values as close as possible to the forty-one integer values distributed in steps of 1 dB between 0 dB and 40 dB. The values of the angular position of the plunger 10 corresponding to these forty one attenuation values are recorded in a memory 80 of the management unit 50, which completes the calibration procedure. According to one advantage of the invention, the calibration of the attenuator needs to be carried out only once, after assembly. The response of the attenuator is then a function only of the angular position of the plunger. In particular, it is independent of the temperature and all other working conditions in the frequency range for which it is designed (here 23 to 26 GHz) . Furthermore, the angular position of the plunger is set definitively using the drive means described above.

Subsequently, during operation of the attenuator, the memory 80 is addressed by a setpoint value VCA of the attenuation which lies between 0 and 40 dB, and the setpoint value for the angular position of the plunger, expressed over seven bits, is read from the memory 80 and copied into the setpoint register 60 of the management unit 50.

Figure 7:
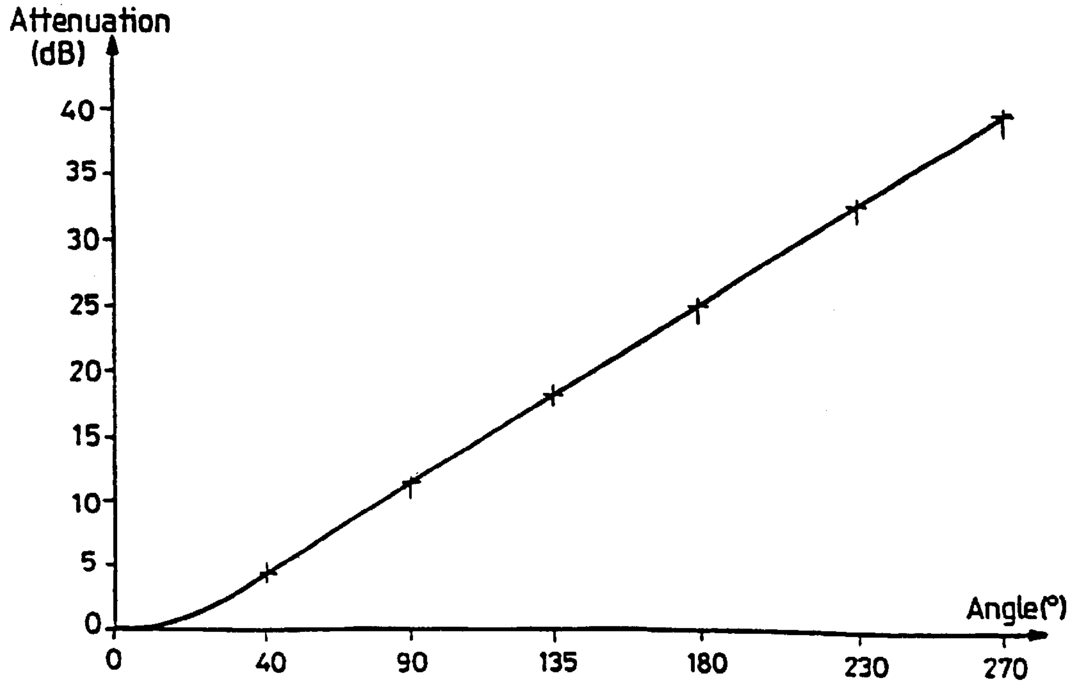
FIG. 7 represents a curve showing the attenuation of an attenuator device according to the invention as a function of the angular position of the plunger.

FIG. 7 represents a few values of the attenuation provided by an attenuator corresponding to the preferred embodiment of the invention, as a function of values of the angular position of the plunger 10 which lie between an initial value, denoted 0° on the abscissa axis (by convention) and a final value which corresponds to rotating the plunger through 270° relative to the said initial position. These attenuation values were obtained for an incident microwave whose frequency was equal to 23 GHz and whose power was equal to 100 mw (i.e. 20 dBm). As can be seen, the response of the attenuator as a function of the angular position of the plunger is linear from 30° onwards and gives values of between 0 and 40 dB, the latter value being reached only when the depth to which the plunger is inserted into the guide is equal to the height b of the said guide (i.e. when the guide is fully closed).

What is claimed is:

1. An attenuator device for a rectangular waveguide having a propagational axis, a first face and a second face opposite the first face, comprising:

a longitudinal slot in the first face along the propagational axis; and a cutout in the second face oppostie the longitudinal slot;

a plunger element of substantially plane shape which can be inserted into the waveguide through the longitudinal slot, where the plunger element is rotatable about an eccentric axis orthogonal to the propagation axis so that a height to which the plunger element is inserted into the waveguide is a function of the angular position of the plunger element; and two symmetrical half-shells, each of which has a longitudinal groove and a recess, where the recess opens into the groove, so that, when the two half-shells are assembled, the grooves form the waveguide and the recesses form a cavity that accommodates the plunger element, the intersection between the waveguide and the cavity then forming the longitudinal slot.

2. The device of claim 1, wherein the cavity has a circular shape, with the cavity's center coinciding with the eccentric axis.

* * * * *